Figure 1:
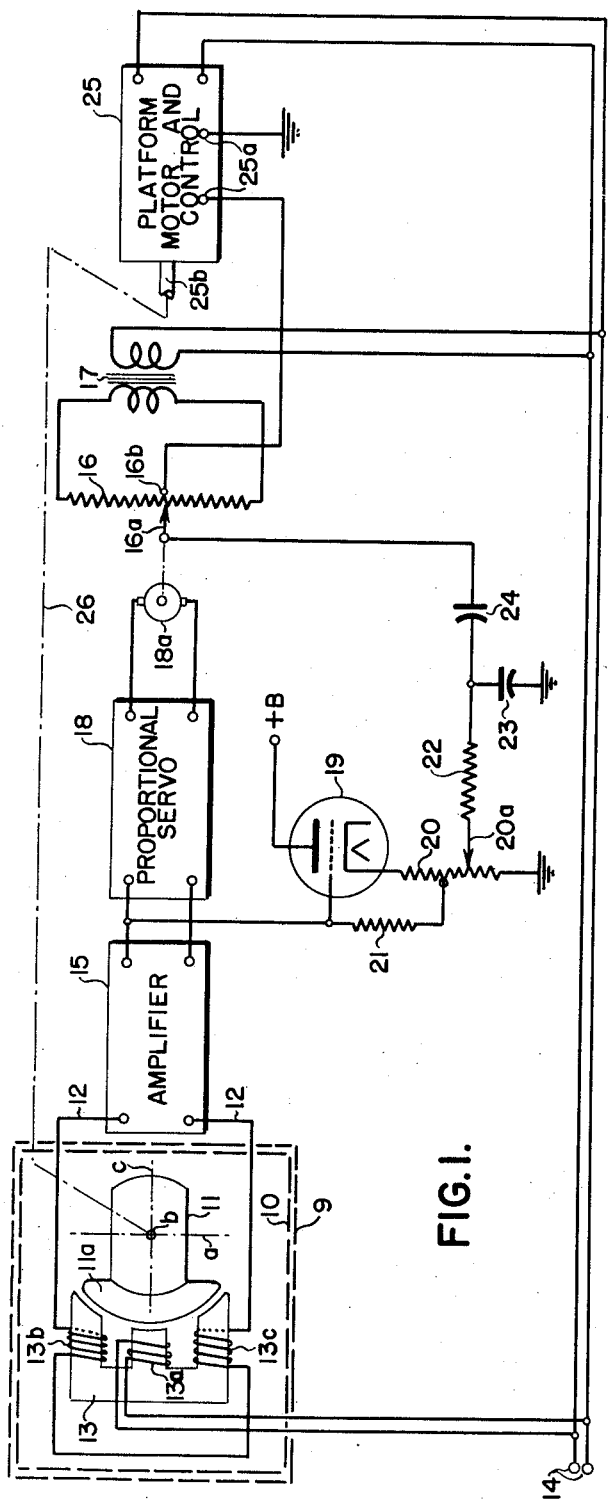

May 13, 1952 W. W. SHANNON 2,596,732
REBALANCING SERVO SYSTEM
Filed Oct. 18, 1946 2 SHEETS—SHEET 1

INVENTOR.
WILLIAM W. SHANNON
BY Laurence B. Dodds

May 13, 1952  W. W. SHANNON  2,596,732
REBALANCING SERVO SYSTEM
Filed Oct. 18, 1946  2 SHEETS—SHEET 2

INVENTOR.
WILLIAM W. SHANNON

Patented May 13, 1952

2,596,732

UNITED STATES PATENT OFFICE 2,596,732

REBALANCING SERVO SYSTEM

William W. Shannon, Glen Cove, N. Y., assignor to Fairchild Camera and Instrument Corporation, a corporation of Delaware Application October 18, 1946, Serial No. 704,022

9 Claims. (Cl. 318—31)

This invention relates to servo systems and, while it is of general application, it is particularly suitable for use in closed-loop rebalancing servo systems for the control of gyroscopic stabilizing apparatus.

In the copending application of Henry E. Hale, Serial No. 621,066, filed October 8, 1945, entitled "Gyro-Stabilizing System," and assigned to the same assignee as the present application, there is disclosed and claimed a gyroscopic stabilizing system comprising a closed-loop rebalancing servo system including in the loop an integrating device embodying a proportional servo mechanism. That system has a number of advantages among which may be mentioned its characteristics of accurate sensitivity to cumulative deviations of the gyroscope from its normal attitude and the great facility with which the gyro system may be set to maintain a given absolute angular velocity or turn rate in space.

The present invention is an improvement on the servo system embodied in the gyroscopic stabilizing system of the aforesaid copending application and is directed particularly to the modification of such system to increase any natural frequency of hunting or oscillation to which the system may be subject, and thus increase its speed of response, while maintaining accurate sensitivity to cumulative deviations of the input control signal and an acceptable stability and freedom from hunting.

It is an object of the invention, therefore, to provide a new and improved servo system in which any frequency of natural oscillation or hunting is substantially increased over known servo systems of such type.

It is another object of the invention to provide a new and improved servo system in which any frequency of natural oscillation or hunting is raised above a value corresponding to any desired time of response of the system while the system is maintained accurately sensitive to cumulative unbalance of the system.

In accordance with the invention, a servo system comprises a circuit effective to develop a periodic signal having an amplitude representative of a control effect, a first signal-repeating means connected to be energized from such circuit and effective to repeat the periodic control signal of such circuit with a time delay so related to the time constant of the system that the system tends to be regenerative for rapid rates of change of the control effect to which the system is responsive. The system also includes a second signal-repeating means effectively in parallel with the first signal-repeating means and effective to repeat the periodic signal with a time delay substantially less than the predetermined time delay, a circuit for combining the periodic signals repeated by the two signal-repeating means, and servo means responsive to the combined repeated signals, whereby the sensitivity of the system to high-frequency variations of the control signal is increased.

Further in accordance with the invention, a servo system comprises a control-signal circuit, integrating means connected to be energized from such circuit and effective to develop a signal representative of the time-integral of the control signal of the circuit, and signal-repeating means connected to the circuit and having a time-translation characteristic substantially faster than that of the integrating means. The system further includes servo means responsive jointly to the time-integral signal and to the output of the signal-repeating means.

Further in accordance with the invention, a gyro-stabilizing system for stabilizing an object pivotally movable about a given axis and including a rate-gyro supported from said object with its pivotal axis and its spin axis lying in a plane at an angle to said given axis, a closed-loop rebalancing servo system comprises, a circuit for deriving a periodic control signal varying with the pivotal movement of the rate-gyro and a servo system of the type described connected to be energized by the control signal output of such deriving circuit.

By the term "time-translation characteristic," as used herein and in the appended claims, is meant the function representing the output signal in terms of the input signal of the system, which includes a time factor which may be either a constant or variable time delay, a time-integral, a time-derivative, etc. By the term "frequency," as used to describe the operation of the rebalancing servo system, is meant a periodic oscillation having a time rate of change of position which is the same as that of the system under consideration. By the expression "effectively in parallel" used herein and in the appended claims in referring to the first and second signal-repeating means is meant that these two means are energized in common at one point in the system and that their repeated signal outputs are combined at a later point in the system, so that the two signal-translating means comprise two channels effectively in parallel between such two points of the system.

For a better understanding of the present invention, together with other and further objects thereof, reference is had to the following description taken in connection with the accompanying drawings, and its scope will be pointed out in the appended claims.

Figure 5B:
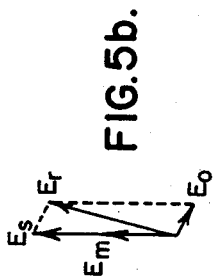
Figure 5A:
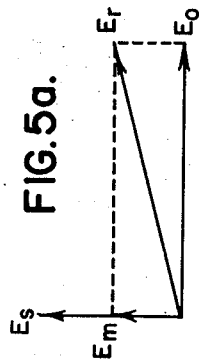
Figure 2:
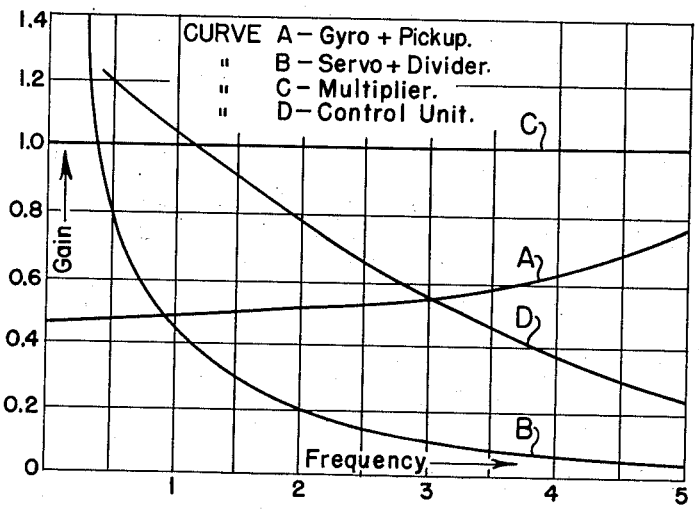
Figure 4:
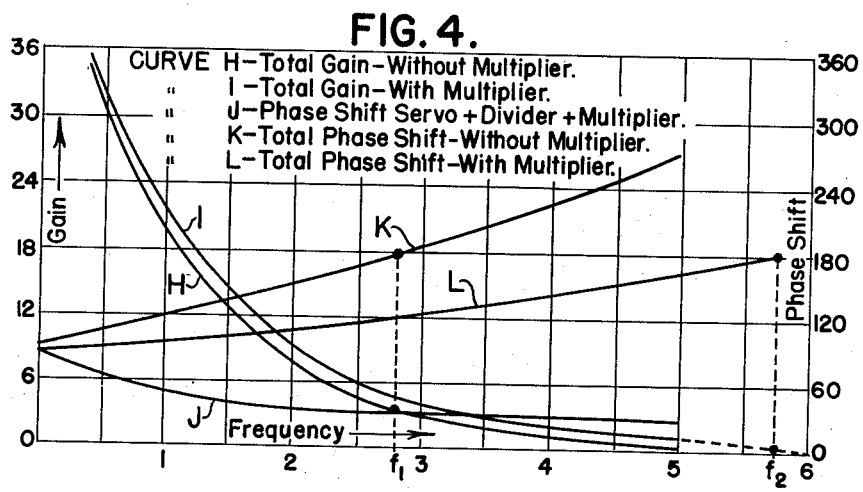
Figure 3:
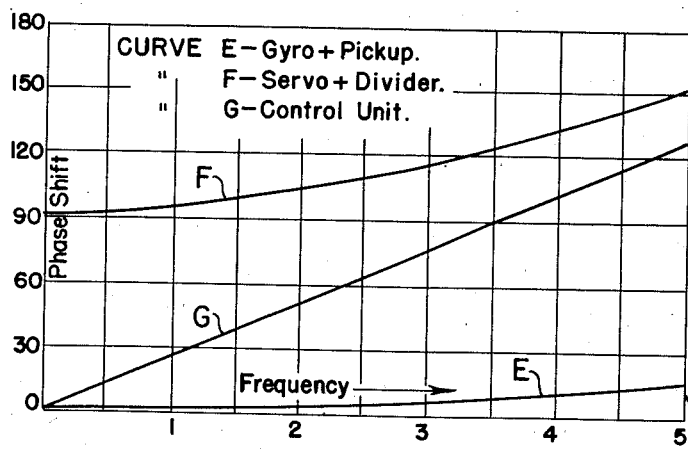

Referring now to the drawings, Fig. 1 is a circuit diagram, partially schematic, of a complete closed-loop rebalancing servo system as applied to a gyroscopic stabilizing system; Figs. 2, 3, and 4, inclusive, are graphs representing certain operating characteristics of the system of Fig. 1 to aid in an explanation of the invention; while Figs. 5a and 5b are vector diagrams of certain signals developed in the system of Fig. 1 further to aid in the explanation of the invention.

Before considering specifically the apparatus embodying the invention, it is believed that it will be helpful to discuss certain fundamental controlling relationships involved in closed-loop rebalancing servo systems. In any such system the total gain around the loop is equal to the product of the gains of the several components, while the total phase shift or time delay around the loop is equal to the sum of the phase shifts of the components. For example, in the embodiment of a closed-loop rebalancing servo system in a gyroscopic stabilizing system, the total gain around the loop is the product of the gain of the gyro pickup in volts/degrees/second; the gain of the servo mechanism in volts/volt; and the gain of the turret and its drive mechanism in degrees/second/volt, so that the resultant is dimensionless. At the same time, the total phase shift around the closed loop is the sum of the phase shifts of these several components.

In a system of the type under consideration, certain phase delays are deliberately introduced into its design for specific purposes. For example, a system phase delay of 180° is provided to make the system degenerative at zero frequency. Further, the servo amplifier is generally designed with an additional 90° phase delay at zero frequency to impart to the system its zero velocity error characteristics. These phase delays, as well as other unavoidable phase delays, increase with increasing frequency of operation. For any given system there is some given frequency of oscillation at which the total system phase shift is approximately 360°; that is, the output of the system is in phase with the input. If the total gain of the system at this frequency is greater than unity, the sysem is obviously regenerative and unstable and will go into natural oscillation.

The present invention is directed to the modification of prior closed-loop rebalancing servo systems of the type described to shift the point at which the total loop phase shift is 360°, either to a point where the total loop gain is below unity, or to a point beyond any frequency of interest, or both.

Referring now to Fig. 1 of the drawings, there is represented, partially schematically, a gyro-stabilizing system for an object, such as a first platform 10, supported from a second platform 9 and pivotally movable about a given axis such as the axis $a$, and including a rate-gyro 11 pivotally supported from the platform 10 with its pivotal axis $b$ (normal to the plane of the paper) and its spin axis $c$ lying in a plane at an angle to, specifically normal to, the pivotal axis $a$ of the platform 10. By way of example, the platform 9 may represent an aircraft and the platform 10 may represent a gun turret which it is desired to stabilize by the system of the invention. With such an arrangement, the deflection of the rate-gyro 11 about its pivotal axis $b$ varies with the angular velocity of platform 10 about its axis $a$.

The stabilizing system includes a closed-loop rebalancing servo system responsive to the angular velocity of the platform 10 and effective to adjust the platform 10 to restore it to its equilibrium attitude of zero angular velocity. This servo system comprises a normally balanced control-signal circuit 12, 12 subject to unbalance by angular movement of the platform 10 about the axis $a$. Specifically, the circuit 12, 12 is effective to derive a control signal varying with the angular velocity of the platform 10 and the angular deflection of rate-gyro 11. To this end, the rate-gyro 11 is provided with a magnetic armature 11a cooperating with an E-magnet 13 mounted on platform 10 in cooperative relation with armature 11a and having an energizing winding 13a on its middle leg and pickup windings 13b and 13c on its outer legs. The exciting winding 13a is connected to suitable alternating-current supply-circuit terminals 14 while the pickup windings 13b and 13c are connected in series opposition to form the control-signal circuit 12, 12.

The servo system also includes a first signal-repeating means connected to be energized from the circuit 12, 12 and effective to repeat the unbalance or control signal thereof with a predetermined time-translation characteristic, preferably with a given and substantial time delay. This signal-repeating means comprises an amplifier 15, which may be entirely conventional, and means effective to develop a signal representative of the time-integral of the amplified unbalance or control signal. This latter means may comprise a voltage divider 16 energized from the supply terminals 14 through a step-down transformer 17 and having an adjustable contact 16a and a fixed mid-point terminal 16b. The integrating means also comprises a proportional servo 18 including a servomotor 18a for adjusting the contact 16a. By the term "proportional servo" is meant a signal-responsive device effective to develop a mechanical motion at a rate substantially proportional to its signal input. An example of such a proportional servo is found in United States Patent No. 2,147,674, granted February 21, 1939, upon the application of Howard A. Satterlee. As explained hereinafter, the adjustment of the contact 16a by the proportional servo 18 is effective to develop at the contact 16a a signal representative of the time-integral of the unbalance or control signal developed in the circuit 12, 12.

The servo system of the invention further includes a second signal-repeating means, for convenience termed a multiplier, effectively in parallel with the signal-repeating means just described and having a different time-translation characteristic for modifying the resultant time-translation characteristic of the closed loop. Specifically, the multiplier signal-repeating means includes a vacuum-tube repeater or amplifier 19 of the cathode-follower type having a cathode load resistor 20 and having its input circuit connected to the control-signal circuit 12, 12 through amplifier 15. A conventional grid-leak resistor 21 of suitable value may be provided while space current for the tube 19 is provided from a suitable source indicated as +B. The load resistor 20 of the repeater 19 is provided with a manually adjustable contact 20a which is connected directly to the adjustable contact 16a through a phase-adjusting filter network comprising a series resistor 22, a shunt condenser 23, and a direct-current blocking condenser 24. The elements 22 and 23 are preferably proportioned to adjust the phase of the alternating control signal translated through the channel including the repeater 19 to correspond to that of the alternating-current signal developed across the voltage divider 16. Preferably, the supply-circuit terminals 14 supply an alternating potential of relatively high frequency, for example, 400 cycles, so that any delay provided by the elements 22, 23 at the frequency of the supply circuit, which might be termed the carrier frequency, is a minimum and preferably substantially zero at the relatively low frequency corresponding to the movement or oscillation of the platform 10 and its rebalancing apparatus, which might be termed the modulation frequency. In any event, the time-translation characteristic of the repeating means including the repeater 19 is much faster than that of the first signal-repeating means including the servo 18 and integrating voltage divider 16.

The servo system of the invention also includes means responsive to the signal repeated by the first signal-repeating means, as modified by the second signal-repeating means, for rebalancing the control-signal circuit 12, 12 and reducing the angular velocity of the platform 10; specifically, restoring it to its equilibrium attitude of zero angular velocity. This signal-responsive means includes means responsive jointly to, specifically to the vector sum of, the signals developed by the two signal-repeating means described. Specifically, the output circuits of the two signal-repeating means are connected in a series circuit due to the connection of the portion of the cathode load 20 of repeater 19 between the adjustable contact 20a and ground in series with the adjustable contact 16a of voltage divider 16. The signal-responsive means further includes a control means responsive to the signal output of the series circuit described for rebalancing the control-signal circuit. This servo means may be of electrical, mechanical, hydraulic, or pneumatic type but is illustrated, by way of example, as being of the electrical type and comprising a reversible platform motor and control unit 25 designed to operate at a speed proportional to the signal applied to its input terminals 25a. The terminals 25a of the unit 25 are connected to the mid-point 16b of voltage divider 16 and to ground, respectively, comprising the series circuit just described, while it may be energized from the common supply terminals 14. The unit 25 is provided with an output shaft 25b connected by way of a mechanism indicated schematically at 26 to the platform 10 to adjust it about its pivotal axis a.

In considering the operation of the rebalancing servo system of the invention described above, it will be assumed that initially the system is in equilibrium so that the contact 16a of voltage divider 16 is at the mid-point or neutral of the divider 16. If, now, the aircraft or other platform 9 on which the platform 10 is mounted executes such a movement that the platform 10 assumes an angular velocity about its pivotal axis a, the rate-gyro 11 will deflect about its axis b with respect to the E-magnet 13, inducing in the control-signal circuit 12, 12 an electrical signal proportional to the angular velocity of the platform 10 about its axis. The constructional details and principle of operation of the rate-gyro 11 may be similar to those of the rate-gyro described and claimed in the copending application of Henry E. Hale, Serial No. 621,066, filed October 8, 1945, now Patent No. 2,592,417, issued April 8, 1952, entitled "Gyro-Stabilizing System" and assigned to the same assignee as the present application.

The control signal developed in the circuit 12, 12 is amplified in the unit 15 and applied to the servo 18 which is effective to adjust the contact 16a of the voltage divider 16 at a rate corresponding to the amplitude of the unbalance or control signal of the circuit 12, 12 and in a direction dependent upon the sense or polarity of such signal. Therefore, the total displacement of the adjustable contact 16a corresponds to the time-integral of the unbalance or control signal and also corresponds to that energization of the motor control unit 25 effective to impart to platform 10 an angular velocity equal and opposite to that of its supporting platform 9. Neglecting for the moment the operation of the multiplier signal-repeating means including the repeater 19, the amplitude of the signal applied to the unit 25 from the adjustable contact 16a is thus also equal to the time-integral of the unbalance or control signal of circuit 12 and the unit 25 is effective to rotate its shaft 25b also at a rate proportional to the amplitude of the signal applied to its input terminals 25a. Thus the unit 25 is effective to drive the platform 10 about its pivotal axis a at an angular velocity representative of the time-integral of the control signal of circuit 12, 12 and thus also representative of the time-integral of the angular velocity of the platform 10 about its axis a. In other words, as the platform 9 changes from zero angular velocity to a given finite angular velocity, the rate-gyro 11 first deflects a finite amount in a given direction, gradually returning to neutral as the platform 10 is brought up to an angular velocity equal and opposite to that of the platform 9 so that the platform 10 and the rate-gyro 11 mounted on it have a fixed attitude in space. When the velocity of platform 10 falls to zero, the rate-gyro 11 deflects in the opposite direction, developing a control signal of opposite polarity in circuit 12, 12 and imparting to platform 10 an angular velocity relative to platform 9 of opposite sense which the system described again gradually reduces to zero.

The total adjustment of platform 10 thus effected is exactly equal and opposite to its total undesired displacement throughout its period of pivotal movement, due to the "memory" characteristic of the integrating means comprising the servo 18 and the voltage divider 16. Thus, the platform 10 is restored accurately to its initial attitude of zero angular velocity.

While the rebalancing system, as described, is inherently of extreme accuracy, it is also somewhat sluggish to rapid or transient pivotal movements of the platform 10, due to the time delay or time-translation characteristic of the integrating means including the servo 18 and the voltage divider 16. In many applications this characteristic is not objectionable but, in certain applications, it is desired that the system should respond with extreme rapidity to fast or transient pivotal movements of the platform 10. While the system as described can, by proper design, be made to respond with any given speed or frequency, if the speed is increased by increasing the speed of response of the servo 18 and the motor drive unit 25, it tends to become unstable and subject to undesired oscillation and hunting.

The multiplier signal-repeating means including the repeater 19, as pointed out above, has a substantially zero time delay, that is, an extremely fast time-translation characteristic, and is designed to modify the characteristic of the first signal-repeating means to enable the system to respond to rapid and transient movements of the platform 10. As pointed out above, the multiplier including the signal repeater 19 has an inappreciable time delay at frequencies corresponding to any movements of platforms 9 and 10 within the operating range of the system. At the same time, the gain of the multiplier is made much less than that of the main signal-repeating means at relatively low frequencies of operation so that its effect at such lower frequencies is inappreciable.

An understanding of the action of the multiplier signal-repeating means may best be had by reference to Figs. 2, 3, and 4 of the drawings, which are characteristic curves obtained from a typical rebalancing servo system embodying the invention. In Fig. 2 there are represented the gain-frequency characteristics of the several individual elements of the system, curve A representing the characteristic of the rate-gyro 11 and pickup 13 which rises moderately with frequency; curve B represents the characteristic of the first signal-repeating means comprising the servo 18 and voltage divider 16 and has very high values at low frequencies but falls rapidly with frequency; curve C represents the characteristic of the multiplier signal-repeating means including the repeater 19 which, it is seen, is substantially uniform with respect to frequency; while curve D represents the characteristic of the platform motor and control unit 25 which, it is seen, falls off relatively rapidly with respect to frequency. In each of Figs. 2, 3, and 4 the abscissae represent the low frequencies of modulation of the control signal output of the rate-gyro 11 due to motion of the platform 9 and is to be distinguished from the frequency of the control signal source 14.

In Fig. 3 are represented the time-translation or phase-shift characteristics of the several elements with respect to frequency, curve E representing that of the rate-gyro and pickup, this characteristic rising only very slightly with frequency and being purposely exaggerated for the sake of clarity; curve F represents the characteristic of the servo 18 and voltage divider 16 which, it is seen, represents a gradually increasing time delay or phase shift with frequency; while curve G represents the characteristic of the control unit 25 which, it is seen, rises rapidly with frequency. The characteristic of the multiplier is not shown since its phase shift is substantially zero at all frequencies under consideration.

Referring now to Fig. 4, there are shown the resultant gain and phase shift or time delay around the closed-loop rebalancing system, both with and without the use of the multiplier. In this figure, curve H represents the resultant gain around the loop, including the gain of the amplifier units, without the use of the multiplier, and thus is proportional to the sum of curves A, B, and D of Fig. 2. Curve I represents the total gain of the closed-loop rebalancing system including the multiplier. This represents the sum of curves A, B, C, and D of Fig. 2, it being remembered that the gain represented by curve C is added vectorially to that represented by curve B. This vectorial addition is represented in Figs. 5a and 5b. In Fig. 5a, which represents conditions at a relatively low frequency, the vector $E_s$ represents the amplified signal output of the circuit 12, 12; the vector $E_o$ represents the servo output signal at the contact 18a which, as indicated by curve F of Fig. 3, lags the input signal substantially 90° at low frequencies; the vector $E_m$ represents the signal output of the multiplier which, it is seen, is substantially in phase with the signal input and of a very much lower amplitude than the signal output of the vector $E_o$. The resultant servo signal applied to the control unit 25 is thus represented by the vector $E_r$ which, at low frequencies, is only slightly greater than the gain of the servo without the multiplier and lags the input control signal nearly 90°.

At high frequencies, however, the conditions are as represented in Fig. 5b in which the same vectors represent the same quantities. As indicated by curve B of Fig. 2, at these high frequencies the gain of the servo is very much reduced so that the vector $E_o$ is correspondingly reduced while its phase is still further retarded, as represented by curve F of Fig. 3. Under these conditions, the output of the multiplier $E_m$ is relatively greater than that of the servo and is the predominant control signal. The resultant $E_r$ is only slightly less than the input signal $E_s$ and is retarded in phase only slightly with respect thereto.

Turning again to Fig. 4, curve J represents the resultant phase shift of the servo and multiplier due to the vector addition of these two signals; curve K represents the total loop phase shift without the multiplier, and curve L represents the total loop phase shift with the multiplier which, it is seen, is very considerably lower at all frequencies within the operating range.

As pointed out above, a closed-loop rebalancing system tends to become regenerative and oscillatory when the total phase displacement of the signal around the loop is 360° and the gain unity or greater. Also as pointed out above, the polarity of the signal around the loop is so adjusted that, at zero frequency, there is a phase delay of approximately 180°. Therefore, whenever there is an aggregate phase delay in the elements of the loop of an additional 180°, the system becomes regenerative if the gain at that frequency is greater than unity. This condition for the system exclusive of the multiplier is represented in Fig. 4 at the frequency $f_1$ of approximately 2.8 cycles per second, at which it is seen from curve K that the total phase shift of the elements of the loop is approximately 180°. Furthermore, from curve H it is seen that the gain at this frequency is approximately 4. Therefore, without the multiplier, the system would be subject to oscillation and hunting. With the addition of the multiplier, however, it is seen that the total phase shift of the elements of the loop does not reach 180° until a frequency $f_2$ of approximately 5.7 cycles per second, which is beyond the normal operating range of the system from which the curves of Figs. 2, 3, and 4 were taken and for which curve L is, therefore, extrapolated. It is also seen that by extrapolating curve I, representing the total gain of the system with the multiplier, the gain at this frequency is extremely small, probably considerably less than unity.

Thus, by the use of the rebalancing servo system of the invention the point at which the total phase shift in the loop is 360° is shifted above the normal frequency range of the system and the gain at this point is reduced below unity. The resultant system has an extremely stable and anti-hunting characteristic while at the same time, due to the use of the multiplier, it responds rapidly to fast and transient pivotal movements of the platform 10.

While there has been described what is at present considered to be the preferred embodiment of the invention, it will be apparent to those skilled in the art that various changes and modifications may be made therein without departing from the invention, and it is, therefore, aimed in the appended claims to cover all such changes and modifications as fall within the true spirit and scope of the invention.

What is claimed is:

1. A servo system comprising, a circuit effective to develop a periodic signal having an amplitude representative of a control effect, a first signal-repeating means connected to be energized from said circuit and including intergrating means effective to develop a periodic signal representative of the time-integral of the control signal of said circuit, a second signal-repeating means effectively in parallel with said first means and effective to repeat said periodic signal with a minimum time delay, a circuit for combining the periodic signals repeated by both said signal-repeating means, and servo means responsive to the combined repeated signals, whereby the sensitivity of the system to high-frequency variations of said control signal is increased.

2. A servo system comprising, a control-signal circuit, a first signal-repeating means connected to be energized from said circuit and including a voltage divider having an adjustable contact and a servo connected to adjust said contact, and a second signal-repeating means having an input circuit effectively in parallel with said first means and having an output circuit connected in series with said adjustable contact, said second signal-repeating means having a minimum time delay for increasing the sensitivity of the system to high-frequency variations of said control signal.

3. A servo system comprising, a control-signal circuit, integrating means connected to be energized from said circuit and effective to develop a signal representative of the time-integral of the control signal of said circuit, signal-repeating means connected to said circuit and having a time-translation characteristic substantially faster than that of said integrating means, and servo means responsive jointly to said signal and the output of said signal-repeating means.

4. A servo system comprising, a control-signal circuit, integrating means connected to be energized from said circuit and effective to develop a signal representative of the time-integral of the control signal of said circuit, signal-repeating means connected to said circuit and having a substantially zero transfer time, and servo means responsive jointly to said signal and the output of said signal-repeating means.

5. In a gyro-stabilizing system for stabilizing an object pivotally movable about a given axis and including a rate-gyro supported from said object with its pivotal axis and its spin axis lying in a plane at an angle to said given axis, a closed-loop rebalancing servo system comprising, a circuit for deriving a periodic control signal varying with the pivotal movement of said rate-gyro, integrating means connected to be energized from said circuit and effective to develop a periodic signal representative of the time-integral of said control signal, signal-repeating means connected to said circuit and effective to repeat said periodic signal with a time-translation characteristic substantially faster than that of said integrating means, and means responsive jointly to said time-integral signal and the output of said signal-repeating means for rebalancing said circuit.

6. A servo system comprising, a circuit effective to develop a periodic signal having an amplitude representative of a control effect, a first signal-repeating means connected to be energized from said circuit and effective to repeat the periodic control signal of said circuit with a predetermined substantial time delay so related to the time constant of the system that the system tends to be regenerative for rapid rates of change of said control effect to which the system is responsive, a second signal-repeating means effectively in parallel with said first means and having a gain substantially less than the maximum gain of said first signal-repeating means and effective to repeat said periodic signal with a time delay substantially less than said predetermined time delay, a circuit for combining the periodic signals repeated by both said signal-repeating means, and servo means responsive to the combined repeated signals, whereby the sensitivity of the system to high-frequency variations of said control signal is increased.

7. A servo system comprising, a circuit effective to develop a periodic signal having an amplitude representative of a control effect, a first signal-repeating means connected to be energized from said circuit and effective to repeat the periodic control signal of said circuit with a predetermined substantial time delay so related to the time constant of the system that the system tends to be regenerative for rapid rates of change of said control effect to which the system is responsive, a second signal-repeating means effectively in parallel with said first means and having a substantially zero time delay and a gain not substantially exceeding unity, a circuit for combining the periodic signals repeated by both said signal-repeating means, and servo means responsive to the combined repeated signals, whereby the sensitivity of the system to high-frequency variations of said control signal is increased.

8. A servo system comprising, a circuit effective to develop a periodic signal having an amplitude representative of a control effect, a first signal-repeating means connected to be energized from said circuit and effective to repeat the periodic control signal of said circuit with a time delay which increases with the rate of change of said control effect, a second signal-repeating means effectively in parallel with said first means and having a gain substantially less than the maximum gain of said first signal-repeating means and effective to repeat said periodic signal with a small and constant time delay, a circuit for combining the periodic signals repeated by both said signal-repeating means, and servo means responsive to the combined repeated signals, whereby the sensitivity of the system to high-frequency variations of said control signal is increased.

9. In a gyro-stabilizing system for stabilizing an object pivotally movable about a given axis and including a rate-gyro supported from said object with its pivotal axis and its spin axis lying in a plane at an angle to said given axis, a closed-loop rebalancing servo system comprising, a circuit for deriving a periodic control signal varying with the pivotal movement of said rate-gyro, a first signal-repeating means connected to be energized from said circuit and effective to repeat the periodic control signal of said circuit with a predetermined substantial time delay so related to the time constant of the system that the system tends to be regenerative for rapid rates of change of said control effect to which the system is responsive, a second signal-repeating means effectively in parallel with said first means and having a gain substantially less than the maximum gain of said first signal-repeating means and effective to repeat said periodic signal with a time delay substantially less than said predetermined time delay, a circuit for combining the periodic signals repeated by both said signal-repeating means, and servo means responsive to the combined repeated signals, whereby the sensitivity of the system to high-frequency variations of said control signal is increased.

WILLIAM W. SHANNON.

REFERENCES CITED

The following references are of record in the file of this patent:

UNITED STATES PATENTS

| Number    | Name    | Date           |
|-----------|---------|----------------|
| 2,068,490 | Hull    | Jan. 19, 1937  |
| 2,401,421 | Hahn    | June 4, 1946   |
| 2,407,657 | Esval   | Sept. 17, 1946 |
| 2,419,812 | Bedford | Apr. 29, 1947  |
| 2,445,773 | Frost   | July 22, 1948  |

OTHER REFERENCES

Theory of Servo Systems with Particular Reference to Stabilization by A. L. Whiteley, Institution of Electrical Engineers, Journal, vol. 93, No. 34, part II (Power Eng.) August 1946, pages 353–367 (discussion pages 368–372).